US010938999B2

(12) United States Patent
Yamamoto et al.

(10) Patent No.: US 10,938,999 B2
(45) Date of Patent: Mar. 2, 2021

(54) IMAGE PROCESSING APPARATUS THAT PERFORMS FILTER OPERATION ON GROUP OF REGIONS IN AN IMAGE, IMAGE PROCESSING METHOD AND NON-TRANSITORY COMPUTER-READABLE STORAGE MEDIUM

(71) Applicant: CANON KABUSHIKI KAISHA, Tokyo (JP)

(72) Inventors: Takahisa Yamamoto, Kawasaki (JP); Yoshinori Ito, Tokyo (JP); Kotaro Yano, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/397,307

(22) Filed: Apr. 29, 2019

(65) Prior Publication Data
US 2019/0349484 A1    Nov. 14, 2019

(30) Foreign Application Priority Data

May 8, 2018   (JP) .............................. JP2018-090106

(51) Int. Cl.
*H04N 1/00*     (2006.01)
*G06F 9/30*     (2018.01)
*G06K 9/00*     (2006.01)
*G06N 3/02*     (2006.01)
(Continued)

(52) U.S. Cl.
CPC .......... *H04N 1/00167* (2013.01); *G02B 5/20* (2013.01); *G06N 3/02* (2013.01); *H04N 1/0289* (2013.01)

(58) Field of Classification Search
CPC .. H04N 1/00167; H04N 1/0289; H04N 1/028; G02B 5/20; G06N 3/02
See application file for complete search history.

(56) References Cited

U.S. PATENT DOCUMENTS

| 5,619,619 A * | 4/1997 | Shinohara ................ G06K 9/66 706/28 |
| 7,480,584 B2 | 1/2009 | Mitarai et al. |
| 10,360,664 B2 * | 7/2019 | Lee ...................... G06K 9/4609 |

(Continued)

FOREIGN PATENT DOCUMENTS

| JP | 2004272657 A | 9/2004 |
| JP | 2005244927 A | 9/2005 |

OTHER PUBLICATIONS

Sun et al. "Deep Learning Face Representation by Joint Identification-Verification." Conference on Neural Information Processing Systems Proceedings. 2014: 1-9.

*Primary Examiner* — Juan M Guillermety
(74) *Attorney, Agent, or Firm* — Rossi, Kimms & McDowell LLP

(57) ABSTRACT

By a first grouping pattern, a plurality of regions for which a filter operation is to be performed in an operation target image are grouped. Then, for each group obtained by the first grouping pattern, a first filter corresponding to the group is used to perform a filter operation on each region belonging to the group. By a second grouping pattern, a plurality of regions for which a filter operation is to be performed in an intermediate image obtained by the filter operation are grouped. Then, for each group obtained by the second grouping pattern, a second filter corresponding to the group is used to perform a filter operation on each region belonging to the group.

11 Claims, 11 Drawing Sheets

(51) Int. Cl.
*G02B 5/20* (2006.01)
*H04N 1/028* (2006.01)

(56) References Cited

U.S. PATENT DOCUMENTS

| | | | |
|---|---|---|---|
| 2010/0183217 A1* | 7/2010 | Seung | G06K 9/4628 |
| | | | 382/156 |
| 2010/0223219 A1* | 9/2010 | Kato | G06N 3/08 |
| | | | 706/27 |
| 2018/0061020 A1* | 3/2018 | Hiasa | G06T 3/60 |
| 2019/0073560 A1* | 3/2019 | Matei | G06K 9/4628 |

* cited by examiner

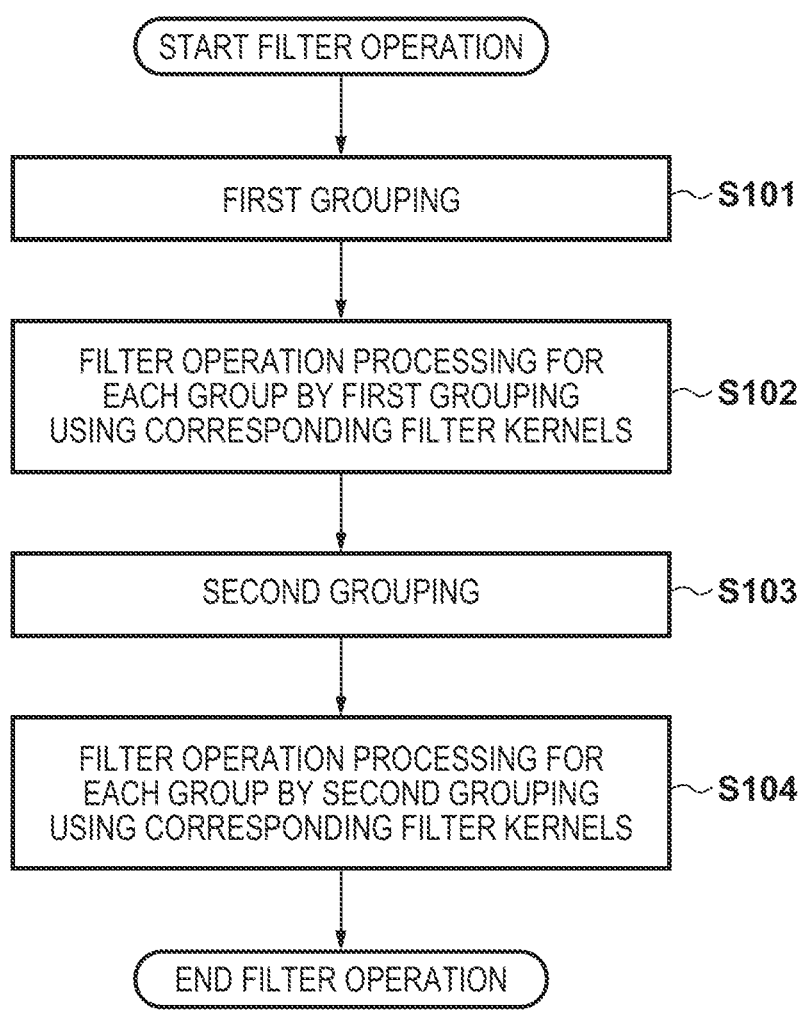

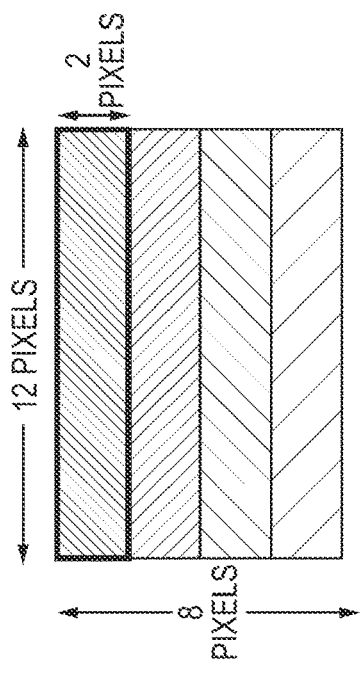
FIG. 3A
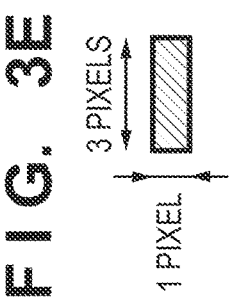
FIG. 3B
FIG. 3C
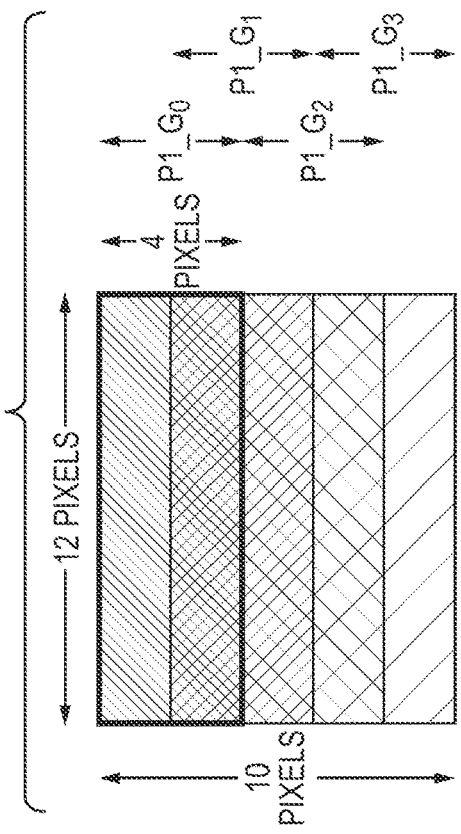
FIG. 3D
FIG. 3E
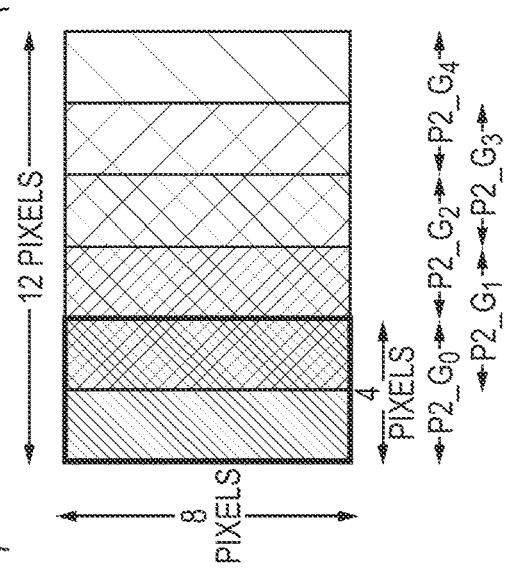
FIG. 3F

| $L_{0,0}[0,0]$ | $L_{0,0}[1,0]$ | $L_{0,0}[2,0]$ | $L_{0,0}[3,0]$ |
|---|---|---|---|
| $L_{0,0}[0,1]$ | $L_{0,0}[1,1]$ | $L_{0,0}[2,1]$ | $L_{0,0}[3,1]$ |
| $L_{0,0}[0,2]$ | $L_{0,0}[1,2]$ | $L_{0,0}[2,2]$ | $L_{0,0}[3,2]$ |
| $L_{0,0}[0,3]$ | $L_{0,0}[1,3]$ | $L_{0,0}[2,3]$ | $L_{0,0}[3,3]$ |

FIG. 6B

| $K_{0,0}[0,0]$ | $K_{0,0}[1,0]$ | $K_{0,0}[2,0]$ |
|---|---|---|
| $K_{0,0}[0,1]$ | $K_{0,0}[1,1]$ | $K_{0,0}[2,1]$ |
| $K_{0,0}[0,2]$ | $K_{0,0}[1,2]$ | $K_{0,0}[2,2]$ |

FIG. 6C

| $F_{0,0}[0,0]$ | $F_{0,0}[1,0]$ |
|---|---|
| $F_{0,0}[0,1]$ | $F_{0,0}[1,1]$ |

FIG. 7A

| $L_{0,0}[0,0]$ | $L_{0,0}[0,1]$ | $L_{0,0}[0,2]$ | $L_{0,0}[0,3]$ |
|---|---|---|---|
| $L_{0,0}[1,0]$ | $L_{0,0}[1,1]$ | $L_{0,0}[1,2]$ | $L_{0,0}[1,3]$ |
| $L_{0,0}[2,0]$ | $L_{0,0}[2,1]$ | $L_{0,0}[2,2]$ | $L_{0,0}[2,3]$ |
| $L_{0,0}[3,0]$ | $L_{0,0}[3,1]$ | $L_{0,0}[3,2]$ | $L_{0,0}[3,3]$ |

FIG. 7B

| $P1\_K_0[0]$ | $P1\_K_0[1]$ | $P1\_K_0[2]$ |
|---|---|---|

FIG. 7C

| $P2\_K_0[0]$ | $P2\_K_0[1]$ | $P2\_K_0[2]$ |
|---|---|---|

FIG. 7D

| $G_{0,0}[0,0]$ | $G_{0,0}[0,1]$ |
|---|---|
| $G_{0,0}[1,0]$ | $G_{0,0}[1,1]$ |

FIG. 11A

| $L_{0,0}[0,0]$ | $L_{0,0}[0,1]$ | $L_{0,0}[0,2]$ | $L_{0,0}[0,3]$ |
|---|---|---|---|
| $L_{0,0}[1,0]$ | $L_{0,0}[1,1]$ | $L_{0,0}[1,2]$ | $L_{0,0}[1,3]$ |
| $L_{0,0}[2,0]$ | $L_{0,0}[2,1]$ | $L_{0,0}[2,2]$ | $L_{0,0}[2,3]$ |
| $L_{0,0}[3,0]$ | $L_{0,0}[3,1]$ | $L_{0,0}[3,2]$ | $L_{0,0}[3,3]$ |

FIG. 11B

| $P1\_K_0[0,0]$ | $P1\_K_0[0,1]$ | $P1\_K_0[0,2]$ |
|---|---|---|
| $P1\_K_0[1,0]$ | $P1\_K_0[1,1]$ | $P1\_K_0[1,2]$ |
| $P1\_K_0[2,0]$ | $P1\_K_0[2,1]$ | $P1\_K_0[2,2]$ |

FIG. 11C

| $P2\_K_0[0,0]$ | $P2\_K_0[0,1]$ | $P2\_K_0[0,2]$ |
|---|---|---|
| $P2\_K_0[1,0]$ | $P2\_K_0[1,1]$ | $P2\_K_0[1,2]$ |
| $P2\_K_0[2,0]$ | $P2\_K_0[2,1]$ | $P2\_K_0[2,2]$ |

FIG. 11D

| $G_{0,0}[0,0]$ | $G_{0,0}[0,1]$ |
|---|---|
| $G_{0,0}[1,0]$ | $G_{0,0}[1,1]$ |

IMAGE PROCESSING APPARATUS THAT PERFORMS FILTER OPERATION ON GROUP OF REGIONS IN AN IMAGE, IMAGE PROCESSING METHOD AND NON-TRANSITORY COMPUTER-READABLE STORAGE MEDIUM

BACKGROUND OF THE INVENTION

Field of the Invention

The present invention relates to a filter operation technique.

Description of the Related Art

Conventionally, specifically in the field of image processing, a two-dimensional data operation, such as a two-dimension convolution filter operation, is performed frequently because arrays of pixel data are two dimensional. FIG. 4 is a view illustrating an example of a convolution filter operation. In FIG. 4, reference numeral 401 illustrates an operation target image. Reference numeral 402 illustrates a filter kernel (a filter weighting), and in FIG. 4, a case in which a filter operation is performed using a filter whose kernel size is 3×3 is illustrated. In such a case, a result (an image) 403 of a convolution filter operation using the filter kernel 402 on the operation target image 401 is obtained by sum-of-products operation processing described in below Equation (1).

$$R[u,v] = \sum_{s=0}^{rowSize-1} \sum_{t=0}^{columnSize-1} (D[u+s,v+t] \times W[s,t]) \quad (1)$$

Note, D[u, v] indicates a pixel value at a pixel position (u, v) (a horizontal coordinate v, a vertical coordinate u) in the operation target image 401, and R[u, v] indicates a pixel value as a convolution filter operation result at a pixel position (u, v) (a horizontal coordinate v, a vertical coordinate u) in the image 403. W[s, t] indicates a coefficient value (a filter coefficient value) at a position (s, t) (a horizontal coordinate s, a vertical coordinate t) in the filter kernel 402, and is a filter coefficient applied to the pixel value of a pixel whose horizontal coordinate is (v+t) and whose vertical coordinate is (u+s) in the operation target image 401. In addition, columnSize and rowSize respectively indicate a horizontal direction size and a vertical direction size of the filter kernel 402, in case of FIG. 4, columnSize=rowSize=3.

A result (the image 403) of the convolution filter operation in relation to the operation target image 401 can be obtained by applying the filter kernel 402 to each pixel position (each scan position) in the operation target image 401 (performing an operation in relation to each pixel position in accordance with Equation (1).) Here, a vertical direction size and a horizontal direction size of an original image (in FIG. 4, the operation target image 401) are assumed to be respectively A and B. At that time, a vertical direction size and a horizontal direction size of an output image (in FIG. 4, the image 403) become respectively (A-rowSize+1) and (B-columnSize+1).

As an operation derived from such a normal convolution filter operation, an operation in which shared filter kernels (filter weights) are used only at local scan positions is proposed in "Deep learning face representation by joint identification-verification", Y. Sun, Y. Chen, X. Wang, and X. Tang, In Proc., NIPS, 2014 (Hereinafter, this operation is referred to as a "local shared weight filter operation"). The same filter kernel is used at all scan positions in the case of a normal convolution filter operation. In contrast to this, in the local shared weight filter operation, the same filter kernel is used at scan positions in local regions in an image, however other filter kernels are used at other local scan positions.

FIG. 5 illustrates an example of this local shared weight filter operation. In FIG. 5, the size of the horizontal direction and the size of the vertical direction of the operation target image 501 are assumed to be respectively 12 pixels and 10 pixels (hereinafter, denoted 12×10.) Reference numeral 502 illustrates an image which is obtained as a result of the local shared weight filter operation in relation to the operation target image 501. Reference numerals 504, 507, and 510 (hatched regions in the operation target image 501) illustrate local regions whose size is 4 pixels×4 pixels (hereinafter, such a local region is referred to as a "weight shared local region") and are local regions at different positions in the operation target image 501. Reference numerals 503, 506, and 509 are the filter kernels (by which the convolution operation is performed) which are applied respectively to the weight shared local regions 504, 507, and 510. In FIG. 5, the size of the filter kernel is assumed to be 3×3. Accordingly, the size of the image 502 obtained as the result of the local shared weight filter operation in relation to the operation target image 501 is 10×8. Reference numerals 505, 508, and 511 illustrate the operation result regions which are calculated by performing the convolution operation in relation to the weight shared local regions 504, 507, and 510 with the filter kernels 503, 506, and 509. In the weight shared local region 504, the size of an operation result region 505 which is obtained as a result of the convolution operation is 2×2 because for the scan position of the filter kernel 503, there are 2 scan positions in the horizontal direction and 2 scan positions in the vertical direction.

In this way, in the local shared weight filter operation, the operation is executed changing the filter kernel for each weight shared local region of 2 scan positions in the horizontal direction and 2 scan positions in the vertical direction. In such a case, the result is obtained by performing the calculation, changing the filter kernel every 2×2 region of the image 502. Accordingly, in order to calculate the image 502 of a size 10×8, 10/2×8/2=5×4=20 weight shared local region settings are necessary, and the same number of filter kernels as the number of weight shared local regions is necessary. Reference numerals 504, 507, and 510 are an arbitrary 3 of the 20 weight shared local regions. Similarly, reference numerals 503, 506, and 509 are an arbitrary 3 of the 20 filter kernels.

In "Deep learning face representation by joint identification-verification", Y. Sun, Y. Chen, X. Wang, and X. Tang, In Proc., NIPS, 2014, the convolution operation using the appropriate filter kernel is executed for every face organ (such as the eyes, the nose, the mouth) by applying the local shared weight filter operation to a facial image, and as a result, an improvement in the accuracy of facial authentication is realized. However, compared to a normal convolution filter operation, the required filter kernel memory amount is large for the local shared weight filter operation. For example, in the example illustrated in FIG. 5, 20 filter kernels are needed whereas only one was needed with the normal convolution filter operation. Accordingly, 20 times the memory amount is needed for storing the filter kernel.

Regarding reducing a memory amount needed for storing filter kernels, a method referred to as a low rank approximation is known (Japanese Patent Laid-Open No. 2004-272657 and Japanese Patent Laid-Open No. 2005-244927.) A low rank approximation is a method in which a decomposition is performed to approximate a two dimensional filter kernel with a set of multiple one dimension filters (a set of a horizontal direction one dimensional filter and a vertical direction one dimensional filter). For example, if a 3×3 filter kernel is decomposed into 1×3 and 3×1 filters, a memory amount needed for storing these one dimension filters is 2/3 the memory amount needed for storing a 3×3 filter kernel.

It is possible to apply this low rank approximation to the filter kernels used in the local shared weight filter operation. The low rank approximation is an effective method against an increase in filter kernel size, however it cannot be said to be an effective method against an increase in the number of the filter kernels. For example, when the size of the filter kernel becomes 5×5, in a low rank approximation, the memory amount becomes 2/5 by decomposition into 1×5 and 5×1 filters. Accordingly, it can be said to be an effective method because the reduction is larger than when the size of the filter kernel is 3×3. However, there is no change in the 2/3 reduction even if the low rank approximation is performed on each of 20 3×3 filter kernels. Accordingly, the effect of applying the low rank approximation is limited when the number of the filter kernels increases as with the local shared weight filter operation.

SUMMARY OF THE INVENTION

The present invention, in consideration of this situation, provides a technique for realizing the filter operation for each region using a smaller number of filter kernels.

According to the first aspect of the present invention, there is provided an image processing apparatus, comprising: a first filter unit configured to group, by a first grouping pattern, a plurality of regions for which a filter operation is to be performed in an operation target image, and for each group obtained by the first grouping pattern, use a first filter corresponding to the group to perform a filter operation on each region belonging to the group; and a second filter unit configured to group, by a second grouping pattern, a plurality of regions for which a filter operation is to be performed in an intermediate image obtained by the filter operation by the first filter unit, and for each group obtained by the second grouping pattern, use a second filter corresponding to the group to perform a filter operation on each region belonging to the group.

According to the second aspect of the present invention, there is provided an image processing method, comprising: grouping, by a first grouping pattern, a plurality of regions for which a filter operation is to be performed in an operation target image, and for each group obtained by the first grouping pattern, using a first filter corresponding to the group to perform a filter operation on each region belonging to the group; and grouping, by a second grouping pattern, a plurality of regions for which a filter operation is to be performed in an intermediate image obtained by the filter operation, and for each group obtained by the second grouping pattern, using a second filter corresponding to the group to perform a filter operation on each region belonging to the group.

According to the third aspect of the present invention, there is provided a non-transitory computer-readable storage medium storing a computer program for causing a computer to function as: a first filter unit configured to group, by a first grouping pattern, a plurality of regions for which a filter operation is to be performed in an operation target image, and for each group obtained by the first grouping pattern, use a first filter corresponding to the group to perform a filter operation on each region belonging to the group; and a second filter unit configured to group, by a second grouping pattern, a plurality of regions for which a filter operation is to be performed in an intermediate image obtained by the filter operation by the first filter unit, and for each group obtained by the second grouping pattern, use a second filter corresponding to the group to perform a filter operation on each region belonging to the group.

Further features of the present invention will become apparent from the following description of exemplary embodiments with reference to the attached drawings.

BRIEF DESCRIPTION OF THE DRAWINGS

FIG. 1 is a flowchart for describing filter operation processing which is executed by the image processing apparatus.

FIGS. 3A to 3F are views which illustrate a procedure of the filter operation which uses in-group shared filter kernels.

Figure 4:
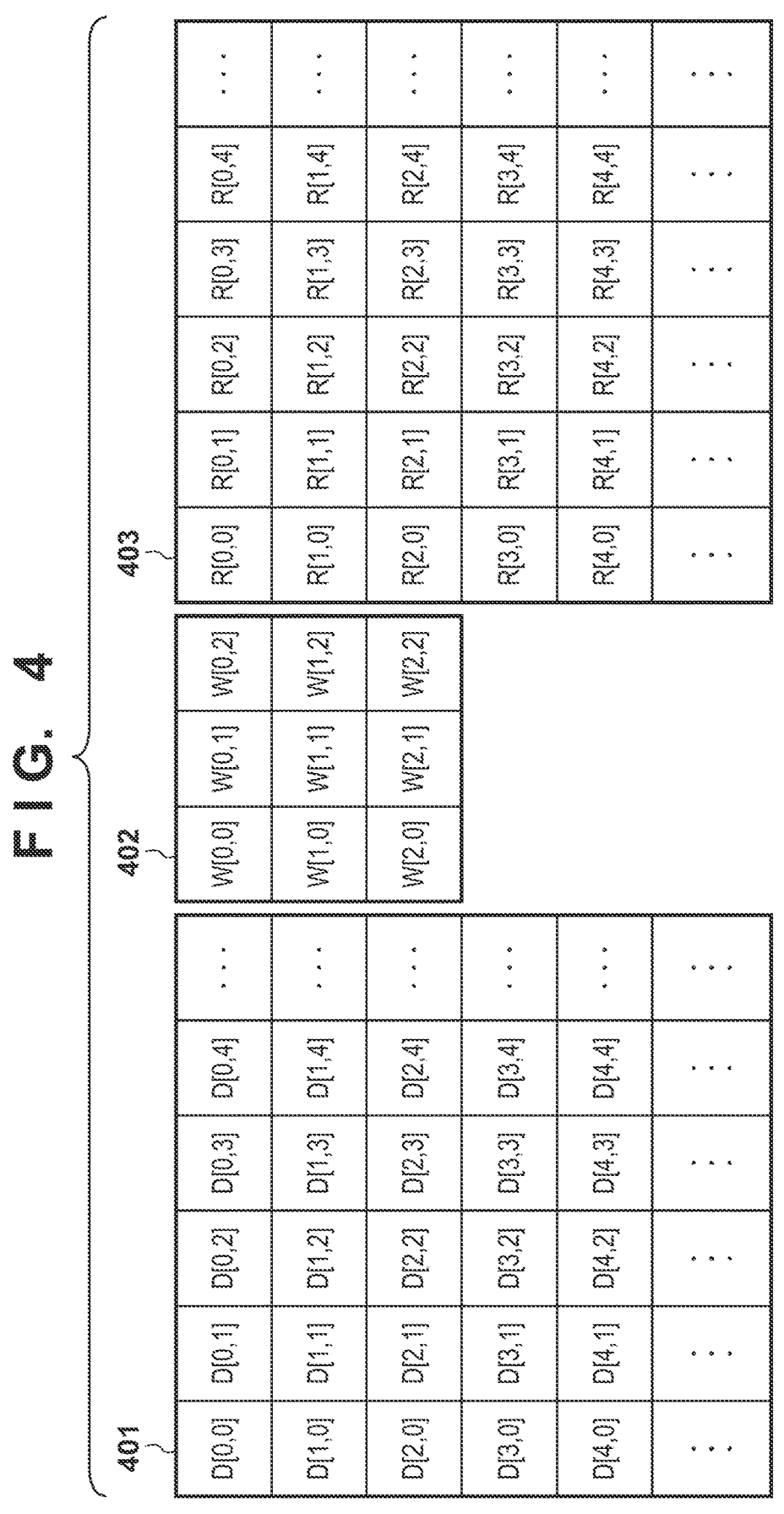

FIG. 4 is a view illustrating an example of a convolution filter operation.

FIGS. 6A through 6C are views which illustrate configuration examples of a weight shared local region, a local shared filter kernel, and an operation result region.

FIGS. 7A through 7D are views which illustrates configuration examples of a weight shared local region, an in-group shared filter kernel, and an operation result region.

FIGS. 11A through 11D are views which illustrate configuration examples of a weight shared local region, in-group shared filter kernels, and an operation result region.

DESCRIPTION OF THE EMBODIMENTS

Below, explanation will be given for embodiments of present invention with reference to the accompanying drawings. Note that the embodiments to be described below are examples of detailed implementations of the present invention or specific examples of configurations described in the scope of the claims.

First Embodiment

The present embodiment reduces the number of filter kernels required in a local shared weight filter operation thereby decreasing the memory required for storing the filter kernels. Also, the present embodiment realizes a filter operation for obtaining an equivalent result to a local shared weight filter operation with less filter kernels than is conventional.

To do so, a plurality of weight shared local regions are divided into several groups (clustering) in the filter operation processing according to the present embodiment. Also, the number of filter kernels required for operation is decreased by performing the filter operation by using a shared filter kernel on all of the weight shared local regions belonging to a group. By this, it becomes possible to decrease the number of required filter kernels, which conventionally was the same as the number of weight shared local regions to be equal to the number of groups.

Here, in order to distinguish a filter kernel used in a conventional local shared weight filter operation and a filter kernel used in a group in the present embodiment, the former is referred to as "a local shared filter kernel" and the latter is referred to as "an in-group shared filter kernel" hereinafter.

As described above, it becomes possible to decrease the number of filter kernels (and therefore memory) by using the in-group shared filter kernels in place of the local shared filter kernels. Additionally, in the present embodiment, it becomes possible to obtain an equivalent result to a local shared weight filter operation using the local shared filter kernels, by approximating the operation of local shared filter kernels by an operation of in-group shared filter kernels. Hereinafter, the filter operation according to the present embodiment is referred to as an "in-group shared filter operation".

Figure 12:
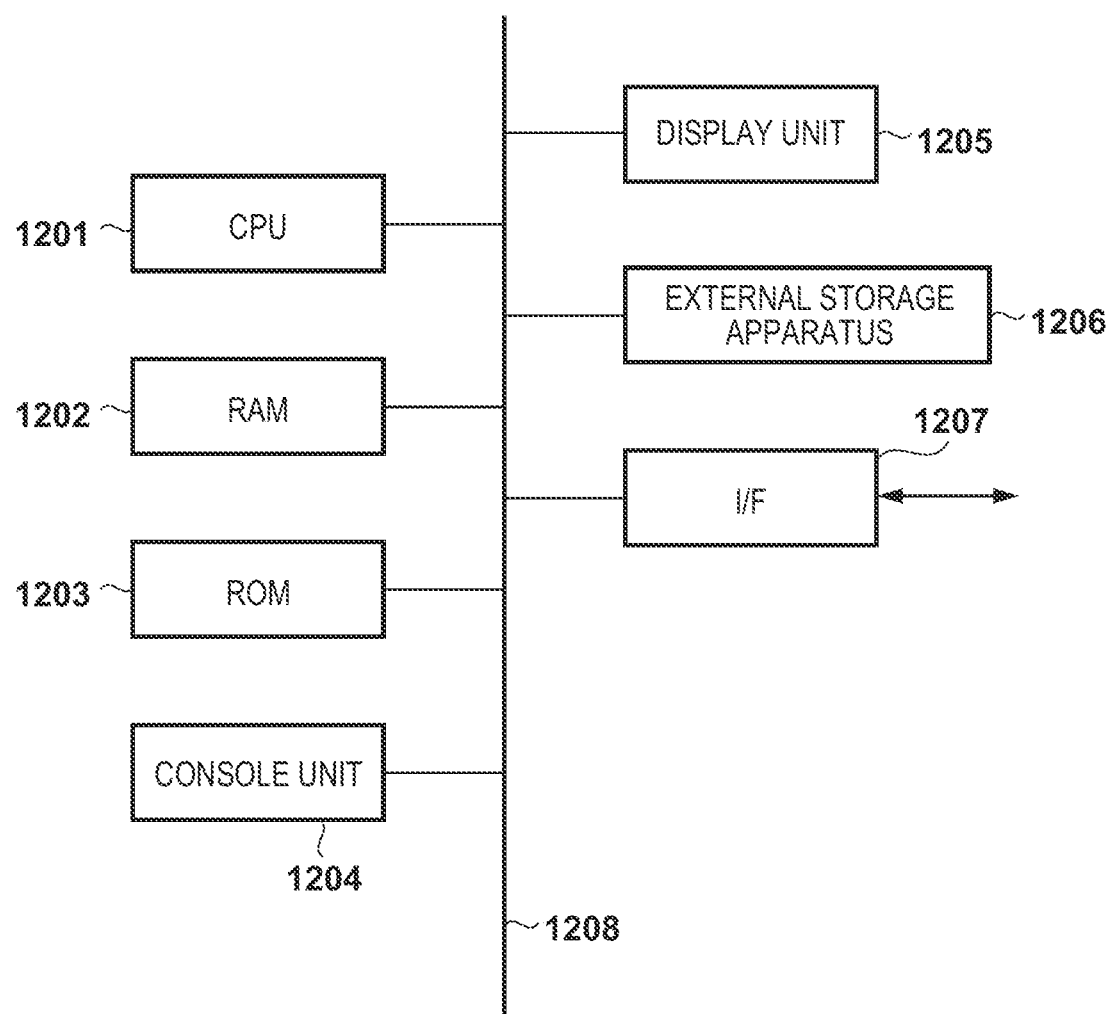
FIG. 12 is a block diagram illustrating an example of a hardware configuration of an image processing apparatus.

Firstly, description using the block diagram of FIG. 12 is given regarding a hardware configuration example of an image processing apparatus that performs the filter operation (in-group shared filter operation) according to the present embodiment. Note, the hardware configuration example of image processing apparatus is not limited to the configuration illustrated in FIG. 12, and any configuration may be taken if the configuration can execute each of the processes described below as things that the image processing apparatus performs.

A CPU 1201 executes various processes by using a computer program or data stored in a RAM 1202 or ROM 1203. By this, the CPU 1201, along with performing operational control of the entire image processing apparatus, executes or controls each of the processes described below as things that the image processing apparatus performs.

The RAM 1202 includes an area for storing a computer program or data loaded from the ROM 1203 or an external storage apparatus 1206 and data received from an external unit via an I/F (interface) 1207. Also, the RAM 1202 includes a work area used when the CPU 1201 executes various processes. In this way, the RAM 1202 can appropriately provide various areas. The ROM 1203 stores information that need not be rewritten such as an activation program and setting data of the apparatus.

A console unit 1204 is configured by a user interface such as a keyboard or a mouse, and a user can operate the console unit 1204 to input various instructions to the CPU 1201. A display unit 1205 is configured by a liquid crystal screen, a touch panel screen, or the like, and can display the results of processing by the CPU 1201 with images, characters, or the like.

The external storage apparatus 1206 is a large capacity information storage apparatus represented by a hard disk drive device. An OS (operating system) and data and computer programs for allowing each process described later as something that the image processing apparatus performs to be executed or controlled by the CPU 1201 is saved in the external storage apparatus 1206. What is described as known information in the following description is also included in the data stored in the external storage apparatus 1206. A computer program or data stored in the external storage apparatus 1206 is loaded into the RAM 1202 as needed in accordance with control by the CPU 1201 and becomes the target of processing by the CPU 1201.

The I/F 1207 functions as an interface for performing data communication between an external unit and the apparatus.

For example, an image to be the target of processing by the image processing apparatus may be received from an apparatus such as an image sensing apparatus or a server apparatus via the I/F 1207. The CPU 1201, the RAM 1202, the ROM 1203, the console unit 1204, the display unit 1205, the external storage apparatus 1206, and the I/F 1207 are all connected to a bus 1208.

It is possible to apply a PC (personal computer), a smart phone, and a tablet type terminal apparatus as the image processing apparatus according to the present embodiment. Also, the image processing apparatus according to the present embodiment may be mounted as hardware embedded in an image sensing apparatus such as a digital camera.

Next, description is given regarding an in-group shared filter operation that the image processing apparatus performs on an operation target image. Firstly, description is given regarding a procedure in which a plurality of weight shared local regions are grouped and then description is given regarding a procedure of a filter operation in which in-group shared filter kernels are used. After this, description is given regarding a procedure in which local shared filter kernels are approximated by an in-group shared filter kernel.

Figure 5:
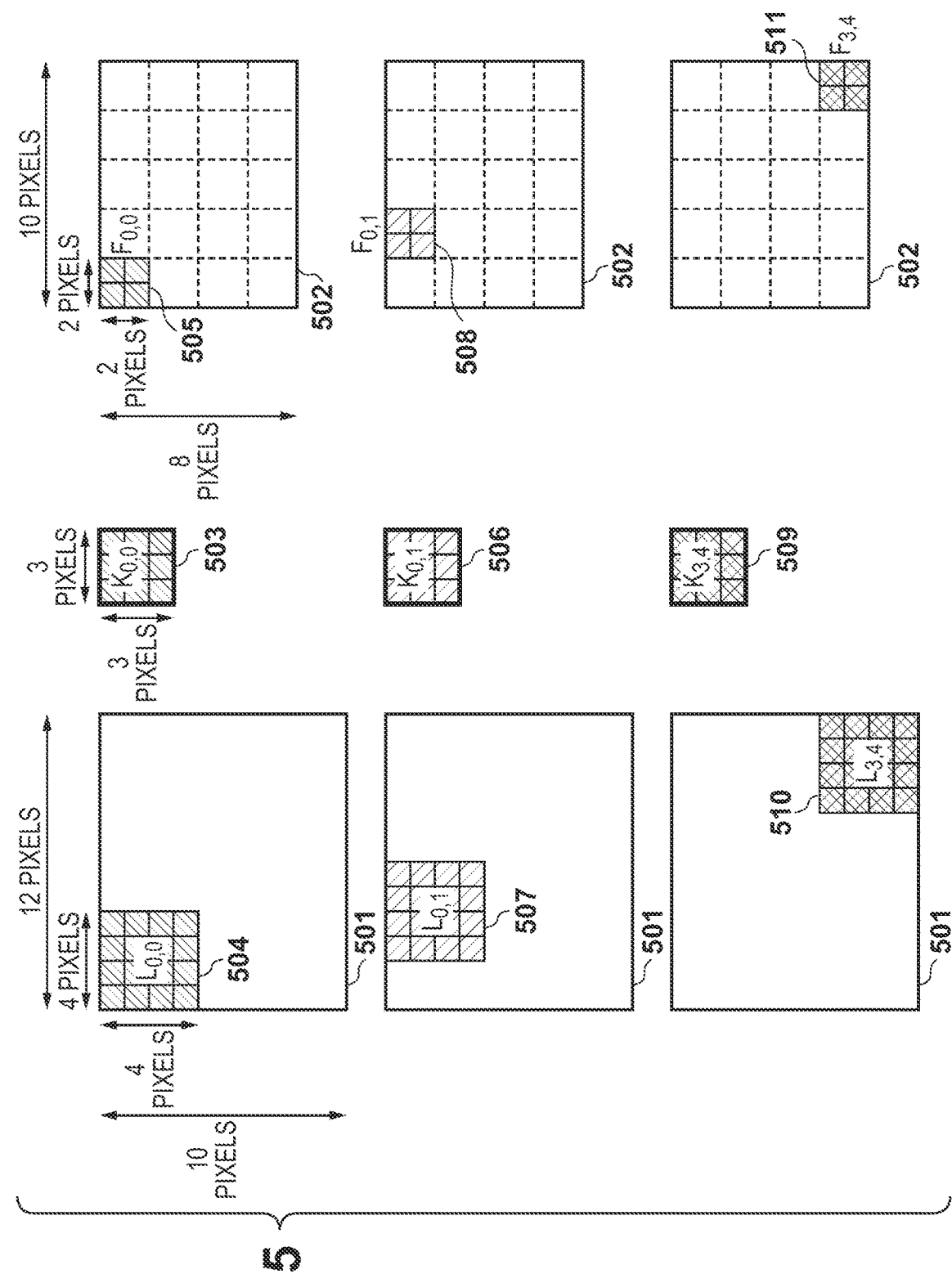
FIG. 5 is a view which illustrates an example of a local shared weight filter operation.

Note that in the present embodiment, an example applied to the local shared weight filter operation illustrated in FIG. 5 is given. In other words, an example applied to a local shared weight filter operation performed by using 20 filter kernels, having set 20 (5 in the horizontal direction×4 in the vertical direction) weight shared local regions in relation to the operation target image 501 of 12 pixels in the horizontal direction and 10 pixels in the vertical direction is given.

Firstly, description is given regarding a procedure in which a plurality of weight shared local regions are grouped. Hereinafter, the weight shared local regions are denoted as $L_{i,j}$ (i=0, 1, 2, 3, j=0, 1, 2, 3, 4). Here, i and j respectively are an index representing a position of the vertical direction of and an index representing a position of the horizontal direction of a weight shared local region. For example, in FIG. 5, the weight shared local region 504 is $L_{0,0}$, a weight shared local region 507 is $L_{0,1}$, and a weight shared local region 510 is $L_{3,4}$.

Furthermore, a filter kernel set in advance as the filter kernel applied to the weight shared local region $L_{i,j}$ is denoted as $K_{i,j}$ (i=0, 1, 2, 3 and j=0, 1, 2, 3, 4). Accordingly, for example, in FIG. 5, the filter kernel 503 is $K_{0,0}$, the filter kernel 506 is $K_{0,1}$, and the filter kernel 509 is $K_{3,4}$.

Also, the operation result region obtained by performing the filter operation by using the filter kernel $K_{i,j}$ on the weight shared local region $L_{i,j}$ is denoted as $F_{i,j}$ (i=0, 1, 2, 3, j=0, 1, 2, 3, 4). Accordingly, for example, in FIG. 5, an operation result region 505 is $F_{0,0}$, an operation result region 508 is $F_{0,1}$, and an operation result region 511 is $F_{3,4}$.

In the case of FIG. 5, grouping of the 20 weight shared local regions is performed. How the groups are divided is determined in advance, and it is assumed that several patterns are prepared for dividing the groups. For example, grouping of the following two patterns is performed in the present embodiment.

Figure 2A:
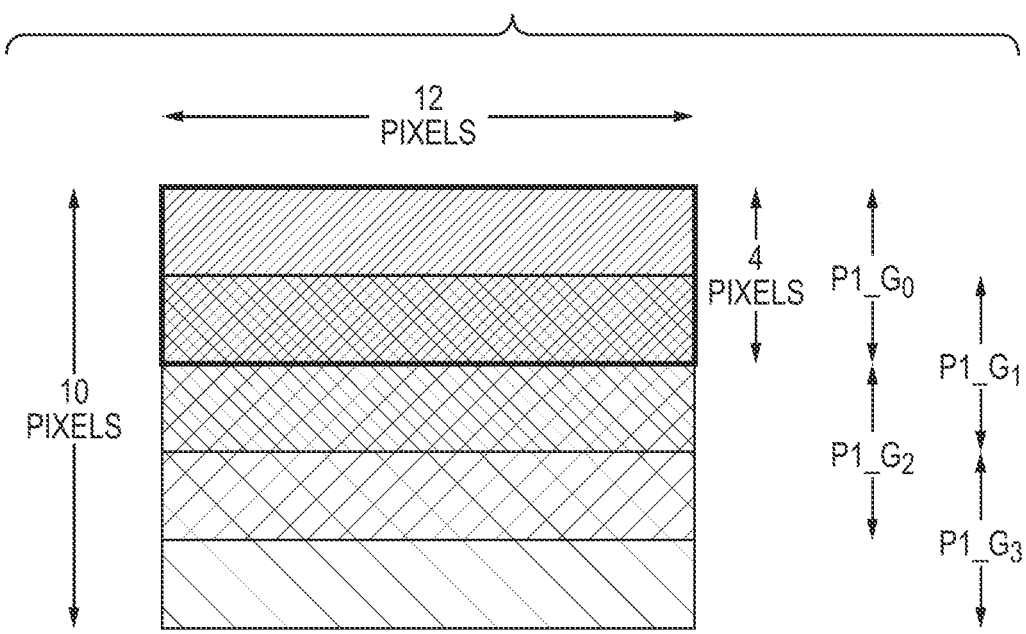
FIGS. 2A and 2B are views which illustrate groupings of weight shared local regions.

A result of grouping the weight shared local region in the operation target image by a "first grouping pattern" is shown in FIG. 2A. The "first grouping pattern" is a grouping in which the weight shared local regions $L_{i,j}$ whose i values are the same among the weight shared local regions $L_{i,j}$ (i=0, 1, 2, 3, j=0, 1, 2, 3, 4) are put into the same group. In such a case, the weight shared local regions $L_{0,0}$, $L_{0,1}$, $L_{0,2}$, $L_{0,3}$, $L_{0,4}$ are grouped into the same group (the group for i=0). Similarly, the weight shared local regions $L_{1,j}$ (j=0, 1, 2, 3, 4) are grouped into the same group (the group for i=1), and the weight shared local regions $L_{2,j}$ (j=0, 1, 2, 3, 4) are grouped into the same group (the group for i=2). Similarly, the weight shared local regions $L_{3,j}$ (j=0, 1, 2, 3, 4) are grouped into the same group (the group for i=3).

In this way, by the "first grouping pattern", the weight shared local regions in the operation target image 501 are grouped into four groups. Hereinafter, "the group for i=0" is denoted as $P1\_G_0$, "the group for i=1" is denoted as $P1\_G_1$, "the group for i=2" is denoted as $P1\_G_2$, and "the group for i=3" is denoted as $P1\_G_3$.

Since the weight shared local regions have mutually overlapping regions, the groups also have mutually overlapping regions. In order to avoid the view in FIG. 2A becoming complex, only $P1\_G_0$ is framed by a bold line. The size of each group as grouped by the "first grouping pattern" is 12 pixels×4 pixels because the size of the weight shared local regions is 4 pixels×4 pixels.

Figure 2B:
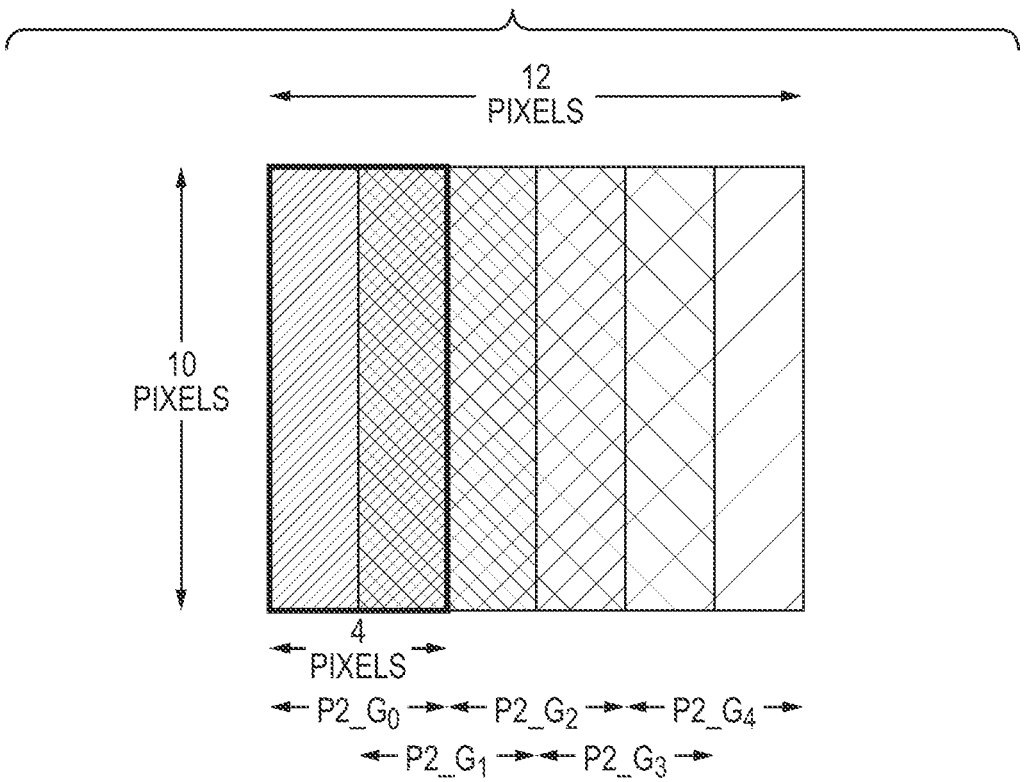

Next, a result of grouping the weight shared local region in the operation target image by a "second grouping pattern" is shown in FIG. 2B. The "second grouping pattern" is a grouping in which the weight shared local regions $L_{i,j}$ whose j values are the same among the weight shared local regions $L_{i,j}$ (i=0, 1, 2, 3, j=0, 1, 2, 3, 4) are put into the same group. In such a case, the weight shared local regions $L_{0,0}$, $L_{1,0}$, $L_{2,0}$, $L_{3,0}$ are grouped into the same group (the group for j=0). Similarly, the weight shared local regions $L_{i,1}$ (i=0, 1, 2, 3) are grouped into the same group (the group for j=1), and the weight shared local regions $L_{i,2}$ (i=0, 1, 2, 3) are grouped into the same group (the group for j=2). Similarly, the weight shared local regions $L_{i,3}$ (i=0, 1, 2, 3) are grouped into the same group (the group for j=3), and the weight shared local regions $L_{i,4}$ (i=0, 1, 2, 3) are grouped into the same group (the group for j=4).

In this way, by the "second grouping pattern", the weight shared local regions in the operation target image 501 are grouped into five groups. Hereinafter, "the group for j=0" is denoted as $P2\_G_0$, "the group for j=1" is denoted as $P2\_G_1$, "the group for j=2" is denoted $P2\_G_2$, "the group for j=3" is denoted $P2\_G_3$, and "the group for j=4" is denoted as $P2\_G_4$.

Since the weight shared local regions have mutually overlapping regions, the groups also have mutually overlapping regions. In order to avoid the view in FIG. 2B becoming complex, only $P2\_G_0$ is framed by a bold line. The size of each group as grouped by the "second grouping pattern" is 4 pixels×10 pixels because the size of the weight shared local regions is 4 pixels×4 pixels.

The filter processing is performed in relation to all weight shared local regions in the group using the same in-group shared filter kernel in the present embodiment as described above. Accordingly, the number of groups and the number of in-group shared filter kernels are the same. A total of 9 in-group shared filter kernels (the 4 in-group shared filter kernels of the first grouping pattern and the 5 in-group shared filter kernels of the second grouping pattern) are necessary in the case of the present embodiment.

Next, description is given regarding a procedure of a filter operation which uses in-group shared filter kernels. A description regarding filter operation processing, which the image processing apparatus performs on the operation target image using the in-group shared filter kernels, will be given using FIG. 1 which illustrates a flowchart for the processing.

The CPU 1201 retrieves the operation target image which is the target of the in-group shared filter operation into the RAM 1202 in step S101. The operation target image may also be a captured image including an object such as human face or the like, or may be a trimmed image (a partial image) which is obtained by extracting a region of the object from the captured image. The CPU 1201 may also obtain the operation target image from the external storage apparatus 1206 or may obtain it from the external unit via the I/F 1207, as described above.

The CPU 1201 sets the weight shared local regions on the operation target image. The CPU 1201 groups (first grouping) the set weight shared local regions using "first grouping pattern", and generates groups $P1\_G_i$ (i=0, 1, 2, 3) for each row of weight shared local regions aligned in the horizontal direction.

In step S102, the CPU 1201, using each filter kernel set in advance as something to be applied to each weight shared local region forming the group $P1\_G_i$ (i=0 to 3), obtains as the in-group shared filter kernel a filter kernel to be shared in each of the weight shared local regions forming the $P1\_G_i$. The CPU 1201, on the group $P1\_G_i$, performs a filter operation which uses the in-group shared filter kernel obtained for the group.

In step S103, the CPU 1201 obtains the image which is obtained by using the filter operation in step S102 as an intermediate image. Then, the CPU 1201 sets the weight shared local regions on the intermediate image. Next, the CPU 1201 groups (second grouping) the set weight shared local regions using "second grouping pattern", and generates groups $P2\_G_j$ (j=0, 1, 2, 3, 4) for each row of weight shared local regions aligned in the vertical direction.

In step S104, the CPU 1201, using each filter kernel set in advance as something to be applied to each weight shared local region forming the group $P2\_G_j$ (j=0, 1, 2, 3, 4), obtains as the in-group shared filter kernel a filter kernel to be shared in each of the weight shared local regions forming the $P2\_G_j$. The CPU 1201, on the group $P2\_G_j$, performs a filter operation which uses the in-group shared filter kernel obtained for the group. Then the CPU 1201 outputs, as a filter processed image, the image obtained as by performing the filter operation processing for every group $P2\_G_j$ (j=0, 1, 2, 3, 4) in the intermediate image. The output destination of the filter processed image is not limited to a specific output destination and the CPU 1201 may store the filter processed image in the RAM 1202 or the external storage apparatus 1206, may output it externally via the I/F 1207, and may display it to the display unit 1205.

The filter operation (in-group shared filter operation) according to the present embodiment for the operation target image is realized by the processing according to the flowchart of FIG. 1 described above. Details of each of the above processes described using the flowchart of FIG. 1 will be described hereinafter.

Here, the in-group shared filter kernel used on the group $P1\_G_i$ (i=0, 1, 2, 3) is referred to as $P1\_K_i$ (i=0, 1, 2, 3). Similarly, the in-group shared filter kernel used on the group $P2\_G_j$ (j=0, 1, 2, 3, 4) is referred to as $P2\_K_j$ (j=0, 1, 2, 3, 4).

Additionally, the filter operation, which is performed on each group $P1\_G_i$ grouped in "first grouping pattern", will be referred to as the "first in-group shared filter operation". Additionally, the filter operation, which is performed on each group $P2\_G_j$ grouped in "second grouping pattern", will be referred to as the "second in-group shared filter operation". Specifically, in the in-group shared filter operations, the first in-group shared filter operation and the second in-group shared filter operation are performed.

FIGS. 3A to 3F are views which illustrate a procedure of the filter operation which uses in-group shared filter kernels.

FIG. 3A illustrates the state (the same as FIG. 2A) in which the operation target image is grouped using the "first grouping pattern".

FIG. 3B illustrates the in-group shared filter kernel which is applied to each group grouped using "first grouping pattern". In "first grouping pattern" as described above, the weight shared local regions are grouped into four groups and an in-group shared filter kernel is assigned to each group. Here, there are 4 in-group shared filter kernels (P1_$K_i$ (i=0, 1, 2, 3)). FIG. 3B illustrates one in-group shared filter kernel out of four. The sizes of the in-group shared filter kernels for the group grouped using "first grouping pattern" are all made to be 1 pixel in the horizontal direction×3 pixels in the vertical direction (1×3).

FIG. 3C illustrates a result of the first in-group shared filter operation. In other words, the result of the filter operation by using the first in-group shared filter kernels (P1_$K_i$ (i=0 to 3)) on the four groups (P1_$G_i$ (i=0 to 3)) grouped by the "first grouping pattern" (FIG. 3A) is illustrated. The size of the image that is the result of the filter processing is 12×2 if the filter processing is performed using 1×3 in-group shared filter kernels because the size of each group grouped using "first grouping pattern" is 12×4. The thick frame region of FIG. 3C indicates the result of the filter processing by using the 1×3 in-group shared filter kernel (P1_$K_0$) on the thick frame region (P1_$G_0$) of FIG. 3A.

FIG. 3D illustrates a state in which the weight shared local regions in an image (FIG. 3C) which is the result of the first in-group shared filter operation are grouped by the "second grouping pattern". Although FIG. 3D corresponds to FIG. 2B, the size of the vertical direction of the image that is the target is made smaller by the first in-group shared filter operation. This is because originally, the state of the grouping of FIG. 2B is vertically contracted due to the filter processing being performed using the 1×3 filter kernel.

FIG. 3E is the in-group shared filter kernel which is applied to each group grouped by the "second grouping pattern". As described above, in the "second grouping pattern", the weight shared local regions are grouped into five groups and an in-group shared filter kernel is assigned to each group. Here, there are 5 in-group shared filter kernels (P2_$K_j$ (j=0, 1, 2, 3, 4)). FIG. 3E illustrates one in-group shared filter kernel out of five. The sizes of the in-group shared filter kernels for the group grouped using "second grouping pattern" are all made to be 3 pixels in the horizontal direction×1 pixel in the vertical direction (3×1).

FIG. 3F illustrates a result of the second in-group shared filter operation. In other words, the result of the filter operation performed by using the second in-group shared filter kernels (P2_$G_j$ (j=0 to 4)) on the five groups (P2_$K_j$ (j=0 to 4)) grouped by the "second grouping pattern" (FIG. 3D) is illustrated. The size of the result of the filter processing is 2×8 if the filter processing is performed using 3×1 in-group shared filter kernels because the size of each group grouped using "second grouping pattern" is 4×8. The thick frame region of FIG. 3F indicates the result of the filter processing performed by using the 3×1 in-group shared filter kernel (P2_$K_0$) on the thick frame region (P2_$G_0$) of FIG. 3D.

As described above, in the filter operation (in-group shared filter operation) according to the present embodiment, the second in-group shared filter operation is performed on the result of the first in-group shared filter operation.

Finally, description will be given regarding a procedure in which local shared filter kernels are approximated by an in-group shared filter kernel. As described above, in the filter processing according to the present embodiment, the aim is to obtain an equivalent effect to the local shared weight filter operation in which the local shared filter kernels are used. Accordingly, it is assumed that a particular weight shared local region is focused on. In such a case, it can be said that it is desirable that the difference between the filter kernels (local shared filter kernels) applied in the local shared weight filter operation processing and the filter kernels (in-group shared filter kernels) applied in the in-group shared filter operation be as small as possible. By this, when local shared filter kernels provided beforehand are approximated by an in-group shared filter kernel, approximation is performed based on this criterium.

Here, the value (pixel value) of an element (pixel) at the position (u, v) (u=0, 1, 2, 3, v=0, 1, 2, 3) within the weight shared local region $L_{i,j}$ when the position of the upper left corner of $L_{i,j}$ is the origin point (0, 0) is denoted as $L_{i,j}$[u, v].

Also, the coefficient value (filter coefficient value) at the position (s, t) (s=0, 1, 2, t=0, 1, 2) within $K_{i,j}$ when the position of the upper left corner of the local shared filter kernel $K_{i,j}$ is the origin point (0, 0) is denoted as $K_{i,j}$[s, t].

Also, the value (pixel value) of an element (pixel) at the position (u, v) (u=0, 1, v=0, 1) within $F_{i,j}$ when the position of the upper left corner of the operation result region $F_{i,j}$ which is the result of the local shared weight filter operation is the origin point (0, 0) is denoted as $F_{i,j}$[u, v].

A configuration example of the weight shared local region $L_{0,0}$ is illustrated in FIG. 6A, a configuration example of the local shared filter kernel $K_{0,0}$ is illustrated in FIG. 6B, and a configuration example of the operation result region $F_{0,0}$ is illustrated in FIG. 6C. Here, $F_{i,j}$[u, v] can be calculated as a result of the convolution operation of $L_{i,j}$ and $K_{i,j}$ by calculating Equation (2) below.

$$F_{i,j}[u,v]=\Sigma_{s=0}^2\Sigma_{t=0}^2(L_{i,j}[u+s,v+t]\times K_{i,j}[s,t]) \quad (2)$$

Also, the coefficient value (filter coefficient value) at a position s within P1_$K_i$ when the uppermost position of the in-group shared filter kernel P1_$K_i$ (i=0, 1, 2, 3) is the origin point (0) is denoted as P1_$K_i$[s] (i=0, 1, 2, 3 s=0, 1, 2).

Also, the coefficient value (filter coefficient value) at a position t within P2_$K_j$ when the uppermost position of the in-group shared filter kernel P2_$K_j$ (i=0, 1, 2, 3, 4) is the origin point (0) is denoted as P2_$K_j$[t] (i=0, 1, 2, 3, 4 s=0, 1, 2).

A configuration example of the in-group shared filter kernel P1_$K_0$ is illustrated in FIG. 7B and a configuration example of the in-group shared filter kernel P2_$K_0$ is illustrated in FIG. 7C. In addition, a configuration example of the weight shared local region $L_{0,0}$ (same as FIG. 6A) is illustrated in FIG. 7A. Also, a configuration example of the operation result region G0, 0 which is a result in which the first in-group shared filter operation and the second in-group shared filter operation are performed on the weight shared local region $L_{0,0}$ is illustrated in FIG. 7D. At that time, $G_{i,j}$[u, v] can be calculated by calculating Equation (3) below.

$$G_{i,j}[u,v]=\Sigma_{s=0}^2\Sigma_{t=0}^2(L_{i,j}[u+s,v+t]\times P1\_K_i[s]\times P2\_K_j[t]) \quad (3)$$

In such a case, in the local shared weight filter operation, the filter kernel applied to the weight shared local region $L_{i,j}$ is $K_{i,j}$[s, t]. The filter kernel applied to the weight shared local region $L_{i,j}$ is made to be P1_$K_i$[s]×P2_$K_j$[t] when the in-group shared filter operation is performed, in other words, in a case where the first in-group shared filter operation and the second in-group shared filter operation are performed.

As described previously, it is desirable that the difference between the filter kernels (local shared filter kernels) applied in the local shared weight filter operation processing and the filter kernels (in-group shared filter kernels) applied in the in-group shared filter operation be as small as possible. Accordingly, considering a cost of an amount that adds the differences for all elements of the two types of filter kernels across the entire weight shared local region, the in-group shared filter kernel may be determined so as to make that cost as small as possible. At that time, Cost is expressed by the following Equation (4).

$$\text{Cost} = \Sigma_{i=0}^{3} \Sigma_{j=0}^{4} \Sigma_{s=0}^{2} \Sigma_{t=0}^{2} (K_{i,j}[s,t] - P1\_K_i[s] \times P2\_K_j[t])^2 \quad (4)$$

In accordance with the present embodiment, a good approximation can be realized by performing an optimization such that the value of Cost described above is decreased. Specifically, a $P1\_K_i[s]$ and $P2\_K_j[t]$ by which the above Cost is minimal are sought out.

A known method may be used as the method for minimizing Cost. For example, the $P1\_K_i[s]$ and $P2\_K_j[t]$ that minimize Cost may be calculated by iterative operation according to a gradient method (steepest decent method). Since there is a possibility that the minimum value is not necessarily reached in the gradient method, a gradient method may be tried a number of times changing the appropriate initial values provided in $P1\_K_i[s]$ and $P2\_K_j[t]$, and $P1\_K_i[s]$ and $P2\_K_j[t]$ may be used as approximation results in a case where the smallest cost is realized. Also, multiple values may be tried for an updating weight used in a repeated calculation of the gradient method. As described above, the local shared filter kernels are approximated by the in-group shared filter kernel. Furthermore, Cost may be calculated in accordance with Equation (5) below.

$$\text{Cost} = \Sigma_{i=0}^{3} \Sigma_{j=0}^{4} \Sigma_{s=0}^{2} \Sigma_{t=0}^{2} E_{i,j} \times (K_{i,j}[s,t] - P1\_K_i[s] \times P2\_K_j[t])^2 \quad (5)$$

Here, $E_{i,j}$ (i=0, 1, 2, 3 j=0, 1, 2, 3, 4) is an approximation accuracy priority coefficient specified in advance for each local shared filter kernel. Here, Cost is expressed by a weighted sum between an error when approximating each local shared filter kernel and the approximation accuracy priority coefficient. Each approximation accuracy priority coefficient $E_{i,j}$ represents whether to prioritize the approximation accuracy of a local shared filter kernel when the local shared filter kernel is approximated by the in-group shared filter kernel. In a case where a specific local shared filter kernel is desired to be approximated with good accuracy, the approximation accuracy priority coefficient corresponding to the local shared filter kernel may be larger than other approximation accuracy priority coefficients. By doing this, the approximation accuracy of the specific local shared filter kernel greatly influences the cost, and therefore the approximation therefor is more accurate than for other local shared filter kernels. In this way, it is also possible to set the priority for the approximation accuracy of the local shared filter kernels. For example, in a case where the local shared weight filter operation is used in facial authentication such as is disclosed in "Deep learning face representation by joint identification-verification", Y. Sun, Y. Chen, X. Wang, and X. Tang., In Proc. NIPS, 2014., a local shared filter kernel corresponding to a weight shared local region by which a feature of an individual person such as an eye or a mouth is expressed can be considered to be important in the facial authentication accuracy. Accordingly, in such a case, the approximation accuracy priority coefficient of the local shared filter kernel corresponding to an eye or mouth region may be made to be large to perform the approximation in the in-group shared filter kernel with better accuracy therefor.

Here, description is given relating to the size of the in-group shared filter kernel. The size of the in-group shared filter kernel is selected such that the relationship between the size of the weight shared local region and the size of the operation result region calculated therefrom in the original local shared weight filter operation is maintained even in the in-group shared filter operation.

For example, as illustrated in FIGS. 6A through 6C, in the original local shared weight filter operation, a 2×2 operation result region is calculated by performing a convolution operation by using a 3×3 filter kernel on a 4×4 weight shared local region.

As illustrated in FIGS. 7A through 7D, the 2×2 operation result region (FIG. 7D) is calculated by performing a convolution operation by using a 1×3 filter kernel (FIG. 7B) and a 3×1 filter kernel (FIG. 7C) on a 4×4 weight shared local region (FIG. 7A) even in the in-group shared filter operation.

In this way, the size of the in-group shared filter kernel may be selected such that the size of the operation result region calculated by the original local shared weight filter operation and the size of the operation result region calculated by the in-group shared filter operation become the same in relation to the same weight shared local region. For example, although an example in which a 1×3 in-group shared filter kernel and 3×1 in-group shared filter kernel are used is illustrated in FIGS. 7A through 7D, the order may be changed and a 3×1 in-group shared filter kernel and a 1×3 in-group shared filter kernel may be used. Furthermore, a 3×3 in-group shared filter kernel and a 1×1 in-group shared filter kernel may be used.

Note, such an in-group shared filter kernel for each group may be created in advance and stored in the external storage apparatus 1206 and read out to the RAM 1202 when it is to be used. Additionally, it may also be obtained after the processing according to the flowchart in FIG. 1 is started or before it is used.

As described in detail above, in the in-group shared filter operation, a plurality of weight shared local regions are grouped, and a filter operation is performed by using a shared filter kernel on every weight shared local region belonging to the group. It is possible to decrease the number filter kernels necessary for the local shared weight filter operation according to this configuration. At that time, by preparing a plurality of grouped patterns (two patterns, for example) and performing a filter operation in which these patterns are applied consecutively, it is possible to obtain a similar result as a case where different filter kernels are applied for each weight shared local region in the operation.

Accordingly, by virtue of the present embodiment, a filter operation in which results similar to a local shared weight filter operation are obtained can be realized if there are filter kernels of a quantity that is the sum of the numbers of groups corresponding to the respective patterns. For example, as described in the present embodiment, a pattern consisting of four groups and a pattern consisting of five groups may be provided in a case of application to the local shared weight filter operation exemplified in FIG. 5. In such a case, 4+5=9 filter kernels are sufficient. In other words, 9 filter kernels are sufficient compared to 20 local shared filter kernels being necessary initially.

Furthermore, each filter kernel becomes smaller compared to a local shared filter kernel of a 3×3 size since the filter kernels are of sizes 1×3 and 3×1. Specifically, it is possible not only that the number of the filter kernels is decreased but also to get by with the filter kernel size itself being small. Accordingly, it becomes sufficient to have memory for storing 3×1×4+1×3×5=27 filter elements in the present embodiment compared to memory for storing 3×3× 20=180 filter elements being necessary in the local shared weight filter operation.

Being able to make the filter kernel size smaller as described above means that it is also possible to realize a decrease in the number of times that a sum-of-products operation required for a filter operation is performed. In the conventional local shared weight filter operation, it is necessary to perform a sum-of-products operation nine times (for a filter kernel size of 3×3) to obtain an operation result for one pixel. In contrast to this, in the in-group shared filter operation, six (corresponding to the size of the 1×3 and 3×1 filter kernels) sum-of-products operations are sufficient to obtain the same operation result for one pixel. Accordingly, it is possible to shorten processing time required for the operation and reduce power consumption.

Second Embodiment

In each of the following embodiments including the present embodiment, description is given regarding differences from the first embodiment, and the following description is similar to the first embodiment unless otherwise stated. The first embodiment gives an example that is applied to a local shared weight filter operation in which local shared filter kernels prepared in advance are used, and realizes a filter operation in which results equivalent to the local shared weight filter operation are obtained while reducing the number of filter kernels. Specifically, in the first embodiment, under the premise that the local shared filter kernels are prepared in advance, the in-group shared filter kernels are calculated from the prepared local shared filter kernels by an approximation operation.

In contrast to this, in the present embodiment, in-group shared filter kernels are calculated directly without the local shared filter kernels. In the present embodiment, description is given of an example that is applied to a case in which the local shared weight filter operation is used for a part of feature extraction processing known as a hierarchical convolutional neural network (CNN). In recent years, using hierarchical feature extraction processing that uses a convolution filter referred to as a CNN to perform image recognition processing for facial authentication and the like has become widespread.

Figure 8:
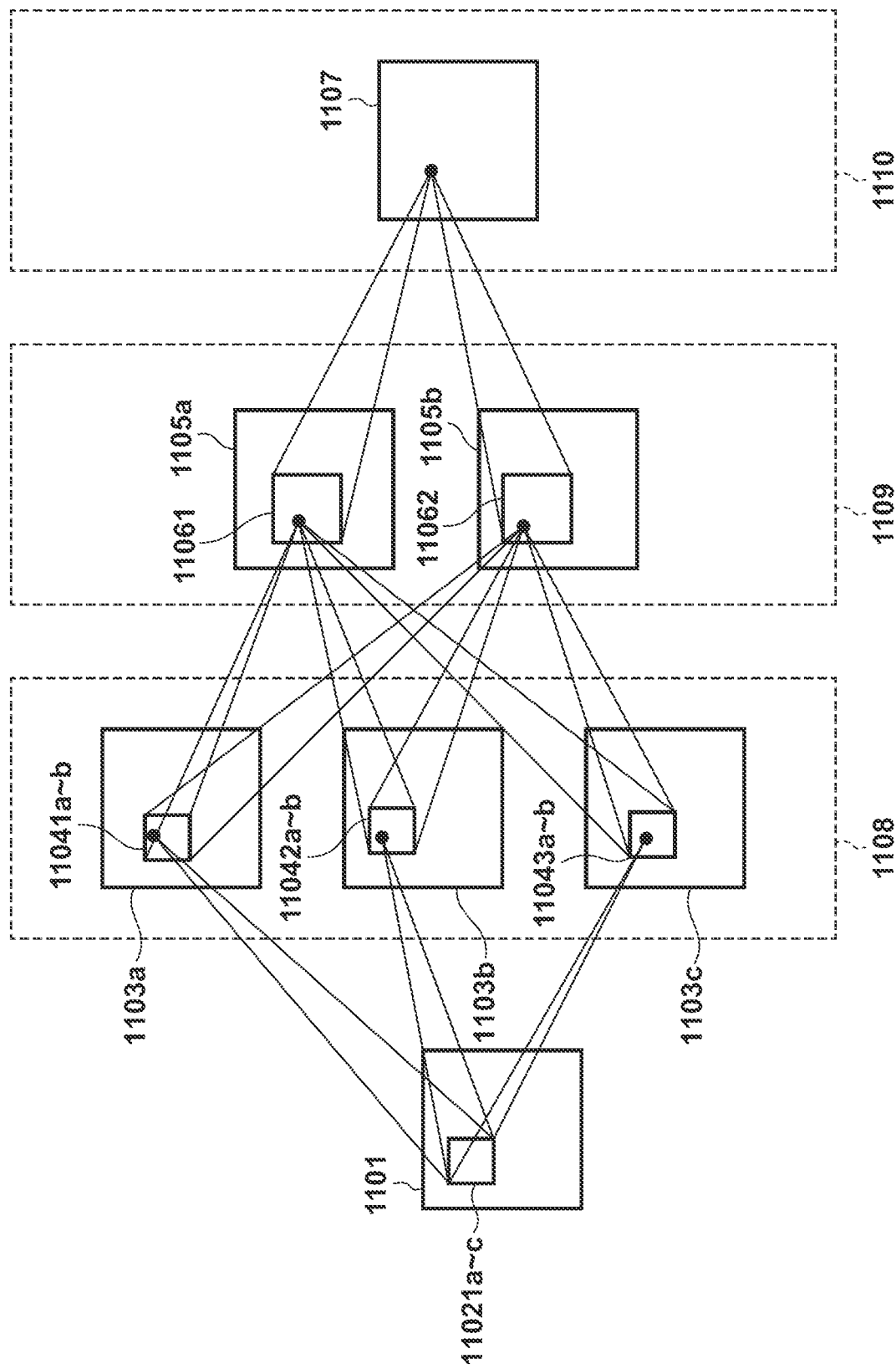
FIG. 8 is a view which illustrates an operation example of a CNN.

Here, a description regarding an example of a CNN operation is given using FIG. 8. FIG. 8 illustrates processing in which feature extraction is performed on an input layer (an input image) 1101 using a CNN to obtain a feature amount 1107. The operation using the CNN is repeated multiple times (three times in FIG. 8) until the feature amount 1107 is obtained from an input layer 1101.

First, a description regarding the first half of CNN processing is given. In FIG. 8, the input layer 1101 illustrates image data of a predetermined size on which a raster scan was performed in a case where a CNN operation is performed on the image data. The feature planes 1103*a* to 1103*c* illustrate feature planes of a first-stage layer 1108. A feature plane is a data plane which indicates a detection result of a predetermined feature extraction filter (convolution filter operation and non-linear processing). The detection result is represented by a plane because the detection result is for the image data for which the raster scan was performed. The feature planes 1103*a* to 1103*c* are generated by a convolution filter operation and the nonlinear processing on the input layer 1101. For example, the feature plane 1103*a* is obtained by a convolution filter operation using a filter kernel 11021*a* and non-linear conversion of the operation result. Note, the filter kernels 11021*b* and 11021*c* in FIG. 8 are filter kernels used when respectively generating the feature planes 1103*b* and 1103*c*.

Next, description is given of an operation for generating a feature plane 1105*a* of a second-stage layer 1109. The feature plane 1105*a* combines the three feature planes 1103*a* to 1103*c* of the previous stage layer 1108. Accordingly, in a case where data of the feature plane 1105*a* is calculated, a convolution filter operation using the kernel illustrated in the filter kernel 11041*a* is performed in relation to the feature plane 1103*a*, and this result is stored. Similarly, convolution filter operations of the filter kernels 11042*a* and 11043*a* are performed in relation to the feature planes 1103*b* and 1103*c* respectively, and these results are stored. After these 3 types of filter operations are completed, the results are added and the non-linear transformation processing is performed. By processing the whole image with the above processing, the feature plane 1105*a* is generated.

Similarly, at a time of a generation of a feature plane 1105*b*, a filter operation of three convolution filters according to filter kernels 11041*b*, 11042*b*, and 11043*b* is performed in relation to the feature planes 1103*a* to 1103*c* of the layer 1108 of the previous stage.

Also, when generating the feature amount 1107 of the third-stage layer 1110, a filter operation of two convolution filters according to the filter kernels 11061 and 11062 is performed on the feature planes 1105*a* to 1105*b* of the layer 1109 of the previous stage. After these 2 types of filter operations are completed, the results are added and the non-linear transformation processing is performed. By processing the whole image with the above processing, the feature amount 1107 is generated.

The filter kernels used in CNN can be calculated in a method which is referred to as Back Propagation (BP) (in general it is expressed as "learning").

As described above, a CNN is a process in which convolution filtering is performed hierarchically (a processing in which the results of processing of a layer are the input of a process of a higher layer). In "Deep learning face representation by joint identification-verification", Y. Sun, Y. Chen, X. Wang, and X. Tang, In Proc. NIPS, 2014, an increase in facial authentication accuracy is realized by using the local shared weight filter rather than a normal convolution filter in the calculation for a specific layer of feature extraction processing in which such a CNN is used. Also, in the network in which the local shared weight filter operation is substituted into the specific layer of the CNN that is disclosed in "Deep learning face representation by joint identification-verification", Y. Sun, Y. Chen, X. Wang, and X. Tang., In Proc. NIPS, 2014., the filter kernels are determined by BP learning.

In a case where a local shared weight filter operation is desired to be performed in a part of the CNN, as is disclosed in "Deep learning face representation by joint identification-verification", Y. Sun, Y. Chen, X. Wang, and X. Tang., In Proc. NIPS, 2014, the in-group shared filter kernels can be calculated by the following procedure directly without the calculation of the local shared filter kernels.

Figure 9:
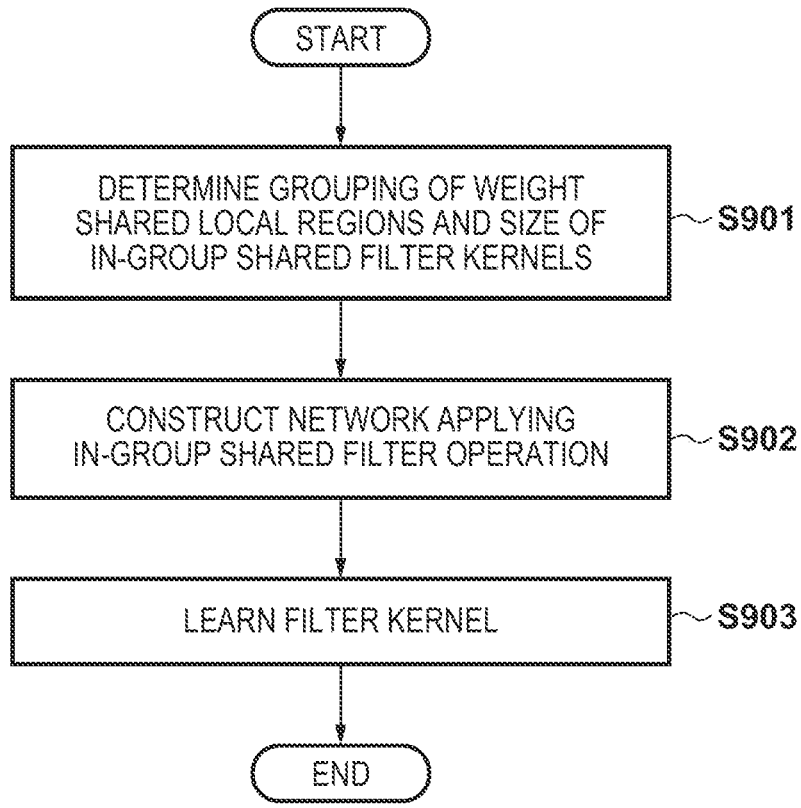
FIG. 9 is a flowchart for describing a procedure for calculating in-group shared filter kernels.

Description is given according to the flowchart of FIG. 9 regarding a procedure for calculating the in-group shared filter kernels according to the present embodiment. In step S901, the CPU 1201 determines a method for grouping the weight shared local regions and the size of the in-group shared filter kernels based on specifications of the local shared weight filter operation.

The specification of the local shared weight filter calculation means the size of the weight shared local regions and the size of the local shared filter kernels, and based on such information, how grouping of the weight shared local regions will be performed is determined and the size of the in-group shared filter kernels is determined. Determination of the method for grouping the weight shared local regions and determination of the size of the in-group shared filter kernels was described in the first embodiment. For example, in a case where the local shared weight filter operation is desired to be performed as in FIG. 5, the grouping as well as the size of the in-group shared filter kernels illustrated in FIGS. 3A to 3F may be used.

Next in step S902, the CPU 1201 performs construction of a network in which the in-group shared filter operation is applied to a part of a CNN. For example, in a case where the local shared weight filter operation is desired to be performed in the second-level layer 1109 of FIG. 8, a network in which the filter operation (the content thereof is determined in step S901) described in the first embodiment is used for that layer is constructed.

Next in step S903, the CPU 1201 performs learning of the filter kernel by applying BP to the network constructed in step S902. The in-group shared filter kernels are also determined (learned) by this learning.

As described above, a network in which the in-group shared filter operation is embedded initially is constructed, and by applying BP to that network, learning of the filter kernels (including the in-group shared filter kernels) is performed. By this, it is possible to directly calculate in-group shared filter kernels without calculation of the local shared filter kernels.

Also, although it is necessary to provide initial values for each filter kernel at a time of learning, values of the in-group shared filter kernels obtained in the method shown in the first embodiment may be used as the initial values, for example. In such a case, typically, learning can be expected to proceed with better efficiency than in a case where random numbers are used as the initial values. Also, it is expected that it is possible to obtain more suitable in-group shared filter kernels for applications realized by using a CNN.

Third Embodiment

In the first and second embodiments, examples in which a plurality of grouping patterns (two patterns, for example) are prepared and an in-group shared filter operation in which these patterns are applied is performed are given. For the in-group shared filter operation at that time, the second in-group shared filter operation is performed on the result of performing the first in-group shared filter operation.

In contrast to this, the present embodiment describes an example in which the in-group shared filter operation is realized by a different operation procedure from the first embodiment and the second embodiment, using the in-group shared filter kernels calculated in the first embodiment or the second embodiment.

Figure 10:
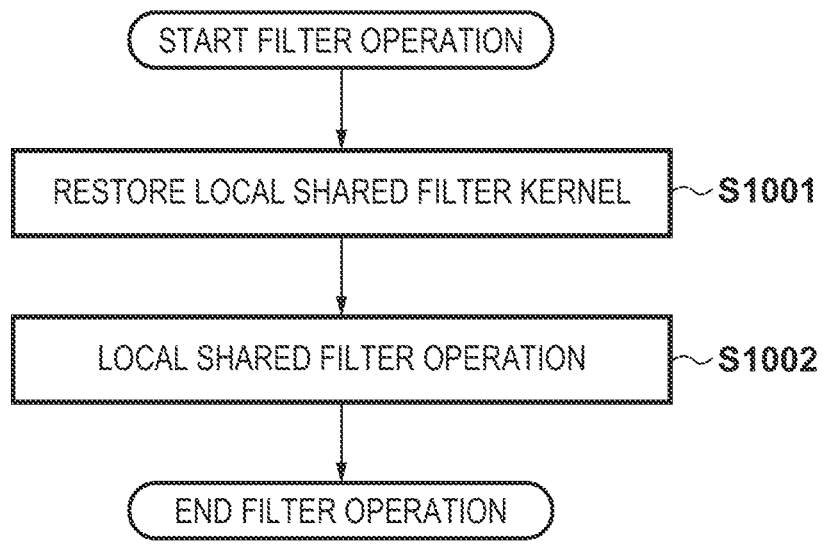
FIG. 10 is a view which illustrates a flowchart of a procedure of a filter operation which uses in-group shared filter kernels.

A description, according to a flowchart in FIG. 10, is given regarding a procedure of the filter operation using in-group shared filter kernels. First, in step S1001, the CPU 1201 approximately restores the local shared filter kernels using the in-group shared filter kernels calculated in the first embodiment and the second embodiment. It is only necessary to perform $P1\_K_i[s] \times P2\_K_j[t]$ operations as can be seen from Equation (3) described above in this restoration. As illustrated in the first embodiment, $P1\_K_i[s]$ and $P2\_K_j[t]$ are calculated so as to make Equation (5) as small as possible. Accordingly, the restored $P1\_K_i[s] \times P2\_K_j[t]$ approximate the original local shared filter kernels.

Next, in step S1002, the CPU 1201 performs the local shared weight filter operation in relation to the operation target image using the local shared filter kernels restored in step S1001. The above is a procedure of a filter operation which uses in-group shared filter kernels.

It is possible to use the same size as that of the original local shared filter kernels for the in-group shared filter kernels when using the operation procedure according to the present embodiment as described above. Description of such a case will be given below.

Assuming the local shared filter kernel illustrated in FIG. 5 as in the first and second embodiments (size of 3×3), the size of the first in-group shared filter kernel and the second in-group shared filter kernel will be 3×3. In such a case, the coefficient value (filter coefficient value) at the position (s, t) in $P1\_K_i$ when the upper left corner position of the first in-group shared filter kernel $P1\_K_i$ is the origin point (0, 0) is denoted as $P1\_K_i[s, t]$ (i=0 to 3 s=0 to 2 t=0 to 2). Also, the coefficient value (filter coefficient value) at the position (s, t) in $P2\_K_j$ when the upper left corner position of the second in-group shared filter kernel $P2\_K_j$ is the origin point (0, 0) is denoted as $P2\_K_j[s, t]$ (j=0 to 4 s=0 to 2 t=0 to 2).

A configuration example of the first in-group shared filter kernel $P1\_K_0$ is illustrated in FIG. 11B and a configuration example of the second in-group shared filter kernel $P2\_K_0$ is illustrated in FIG. 11C. In addition, a configuration example of the weight shared local region $L_{0,0}$ (same as FIG. 6A) is illustrated in FIG. 11A. Also, FIG. 11D illustrates an operation result region obtained by applying the filter kernels obtained by approximately restoring the local shared filter kernels from the above-described two in-group shared filter kernels ($P1\_K_0$ and $P2\_K_0$) to the weight shared local region $L_{0,0}$. At that time, Cost is expressed by the following Equation (6).

$$\text{Cost} = \Sigma_{i=0}^{3} \Sigma_{j=0}^{4} \Sigma_{s=0}^{2} \Sigma_{t=0}^{2} \{K_{i,j}[s,t] - \Sigma_{u=0}^{2} P1\_K_i[s,u] \times P2\_K_j[u,t]\}^2 \quad (6)$$

As in the case of the first embodiment, a good approximation can be realized by performing an optimization such that the value of Cost is decreased. It is expected that compared to the approximation of the local shared filter kernels using Equation (4), the approximation of the local shared filter kernels using Equation (6) will have improved approximation accuracy since the number of parameters (filter kernel elements) adjusted by optimization is greater. Also, in such a case, it is possible to realize a filter operation that uses the in-group shared filter kernels by an operation according to the flowchart illustrated in FIG. 10.

In the case of the present embodiment, the local shared weight filter operation of step S1002 itself is the same as is conventional, but the filter kernel used there are what is approximately restored in step S1001. Accordingly, the memory for storing the filter kernels need only be that for storing the in-group shared filter kernels. Specifically, less memory is needed than what is conventional.

Fourth Embodiment

The criteria for the numerical values (image size, filter size, and the like) and the positioning used in the description according to the first to third embodiments are given as examples in order to provide a specific explanation, and no limitation is made thereto.

Also, in the description according to the first to third embodiments, examples are given in which the horizontal direction and vertical direction are a direction (first direction) along one side of the image and a direction (second direction) orthogonal to that direction. For example, configuration may be taken to reverse the horizontal direction and the vertical direction in the description according to the first to third embodiments, and other directions may be specified.

Also, in the first to third embodiments, the weight shared local regions are regions in the image (the operation target image and the intermediate image) set as a sequence of regions lined up in the horizontal direction and the vertical direction on the image. However, the arrangement of the weight shared local regions on the image (the operation target image and the intermediate image) is not limited to the arrangement described in the first to third embodiments. For example, configuration may also be taken so as to arrange (set) the weight shared local regions so that they overlap each other at particular positions so as to cover regions of interest.

Some or all of the variations or embodiments described above may be appropriately used in combination. Also, some or all of the embodiments described above may be used selectively.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-090106, filed May 8, 2018, which is hereby incorporated by reference herein in its entirety.

What is claimed is:

1. An image processing apparatus, comprising:
one or more processors; and
one or more memories coupled to the one or more processors, the one or more memories having stored thereon instructions which, when executed by the one or more processors, cause the image processing apparatus to:
divide a plurality of regions for which a first filter operation is to be performed in an operation target image into a plurality of first groups each having a plurality of regions in the operation target image, in accordance with a first grouping pattern;
perform the first filter operation, for each first group of the plurality of first groups obtained in accordance with the first grouping pattern, using a first filter corresponding to each first group of the plurality of first groups, on each region of the plurality of regions belonging to each first group of the plurality of first groups;
divide a plurality of regions for which a second filter operation is to be performed in an intermediate image obtained by the first filter operation into a plurality of second groups each having a plurality of regions in the intermediate image, in accordance with a second grouping pattern different from the first grouping pattern; and
perform the second filter operation, for each second group of the plurality of second groups obtained in accordance with the second grouping pattern, using a second filter corresponding to each second group of the plurality of second groups, on each region of the plurality of regions belonging to each second group of the plurality of second groups.

2. The image processing apparatus according to claim 1, wherein the plurality of regions for which the first filter operation is to be performed in the operation target image are grouped for each of sequences of regions lined up in a first direction, and the first filter operation is performed using a first filter corresponding to the sequence of regions in relation to each region in the sequence of regions.

3. The image processing apparatus according to claim 2, wherein the first filter is a filter obtained from filters corresponding to respective regions in the sequence of regions lined up in the first direction.

4. The image processing apparatus according to claim 2, wherein the first filter is a filter obtained by learning in a neural network that includes the one or more processors and the one memory one or more memories.

5. The image processing apparatus according to claim 4, wherein the neural network is a Convolutional Neural Network, and the learning is learning in accordance with back propagation.

6. The image processing apparatus according to claim 1, wherein the plurality of regions for which the second filter operation is to be performed in the intermediate image are grouped for each of sequences of regions lined up in a second direction, and the second filter operation is performed using a second filter corresponding to the sequence of regions in relation to each region in the sequence of regions.

7. The image processing apparatus according to claim 6, wherein the second filter is a filter obtained from filters corresponding to respective regions in the sequence of regions lined up in the second direction.

8. The image processing apparatus according to claim 6, wherein the second filter is a filter obtained by learning in a neural network that includes the one or more processors and the one or more memories.

9. The image processing apparatus according to claim 1, wherein the one or more memories have stored thereon instructions which, when executed by the one or more processors, further cause the image processing apparatus to output an image obtained by the second filter operation as a filter processed image corresponding to the operation target image.

10. An image processing method, comprising:
dividing a plurality of regions for which a first filter operation is to be performed in an operation target image into a plurality of first groups each having a plurality of regions in the operation target image, in accordance with a first grouping pattern;
performing the first filter operation, for each first group obtained in accordance with the first grouping pattern, using a first filter corresponding to each first group of the plurality of first groups, on each region of the plurality of regions belonging to each first group of the plurality of first groups;
dividing a plurality of regions for which a second filter operation is to be performed in an intermediate image obtained by the first filter operation into a plurality of second groups each having a plurality of regions in the intermediate image, in accordance with a second grouping pattern different from the first grouping pattern; and
performing the second filter operation, for each second group of the plurality of second groups obtained in accordance with the second grouping pattern, using a second filter corresponding to each second group of the plurality of second groups, on each region of the plurality of regions belonging to each second group of the plurality of second groups.

11. A non-transitory computer-readable storage medium storing a computer program for causing a computer to execute an image processing method, the image processing method comprising:
dividing a plurality of regions for which a first filter operation is to be performed in an operation target image into a plurality of first groups each having a plurality of regions in the operation target image, in accordance with a first grouping pattern;
performing the first filter operation, for each first group obtained in accordance with the first grouping pattern, using a first filter corresponding to each first group of the plurality of first groups, on each region of the plurality of regions belonging to each first group of the plurality of first groups;
dividing a plurality of regions for which a second filter operation is to be performed in an intermediate image obtained by the first filter operation into a plurality of second groups each having a plurality of regions in the intermediate image, in accordance with a second grouping pattern different from the first grouping pattern; and
performing the second filter operation, for each second group of the plurality of second groups obtained in accordance with the second grouping pattern, using a second filter corresponding to each second group of the plurality of second groups, on each region of the plurality of regions belonging to each second group of the plurality of second groups.

* * * * *